(12) United States Patent
Tsou et al.

(10) Patent No.: US 11,462,995 B2
(45) Date of Patent: Oct. 4, 2022

(54) POWER FACTOR CORRECTION CONTROLLER AND OPERATIONAL METHOD THEREOF

(71) Applicant: Leadtrend Technology Corp., Hsinchu County (TW)

(72) Inventors: Ming-Chang Tsou, Hsinchu County (TW); Kuan-Hsien Chou, Hsinchu County (TW); Yi-Chuan Tsai, Hsinchu County (TW); Cheng-Tsung Ho, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 127 days.

(21) Appl. No.: 16/953,293

(22) Filed: Nov. 19, 2020

(65) Prior Publication Data

US 2021/0281166 A1 Sep. 9, 2021

Related U.S. Application Data

(60) Provisional application No. 62/986,789, filed on Mar. 9, 2020.

(51) Int. Cl.
*H02M 1/42* (2007.01)
*H02M 1/00* (2006.01)

(52) U.S. Cl.
CPC ........ *H02M 1/4258* (2013.01); *H02M 1/0009* (2021.05); *H02M 1/4208* (2013.01); *H02M 1/4225* (2013.01); *H02M 1/4241* (2013.01); *H02M 1/4266* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,489,532 B2 * | 2/2009 | Shih | .................... | H02M 1/4225 363/21.01 |
| 8,867,245 B1 * | 10/2014 | Hwang | ............... | H02M 1/4225 363/21.04 |
| 9,331,592 B2 * | 5/2016 | Knoedgen | ......... | H02M 3/33569 |
| 10,158,282 B1 * | 12/2018 | Maruyama | .......... | H02M 1/4225 |
| 2004/0218410 A1 * | 11/2004 | Yamada | ............ | H02M 3/33523 363/125 |

(Continued)

FOREIGN PATENT DOCUMENTS

TW 201240299 A1 10/2012

*Primary Examiner* — Gary A Nash
(74) *Attorney, Agent, or Firm* — Winston Hsu

(57) ABSTRACT

A power factor correction (PFC) controller applied to a primary side of a power converter includes a feedback pin, a sensing pin, a current detecting circuit, an output voltage detecting circuit, and a determination circuit. The current detecting circuit is coupled to the feedback pin and the sensing pin for detecting an output current of a secondary side of the power converter according to a feedback voltage of the feedback pin and a sensing voltage of the sensing pin. The output voltage detecting circuit is coupled to the feedback pin for detecting an output voltage of the secondary side of the power converter according to the feedback voltage. The determination circuit is coupled to the current detecting circuit and the output voltage detecting circuit for turning on or turning off a PFC circuit coupled to the power converter according to the output current and the output voltage.

14 Claims, 2 Drawing Sheets

(56) References Cited

U.S. PATENT DOCUMENTS

| | | | | |
|---|---|---|---|---|
| 2005/0269997 | A1* | 12/2005 | Usui | H02M 1/4225 |
| | | | | 323/207 |
| 2007/0145956 | A1* | 6/2007 | Takeuchi | H02M 1/4225 |
| | | | | 323/207 |
| 2010/0226149 | A1* | 9/2010 | Masumoto | H02M 1/4225 |
| | | | | 363/20 |
| 2011/0205763 | A1* | 8/2011 | Artusi | H02M 3/33507 |
| | | | | 363/21.06 |
| 2011/0222318 | A1* | 9/2011 | Uno | H02M 3/33523 |
| | | | | 363/21.04 |
| 2014/0210377 | A1* | 7/2014 | Knoedgen | H02M 3/33507 |
| | | | | 363/16 |
| 2015/0098254 | A1* | 4/2015 | Brinlee | H02M 3/3376 |
| | | | | 363/21.02 |
| 2015/0198634 | A1* | 7/2015 | Brinlee | G01R 31/28 |
| | | | | 324/72.5 |

* cited by examiner

POWER FACTOR CORRECTION CONTROLLER AND OPERATIONAL METHOD THEREOF

CROSS REFERENCE TO RELATED APPLICATIONS

This application claims the benefit of U.S. Provisional Application No. 62/986,789, filed on Mar. 9, 2020 and entitled "Optimization and Analysis of Power Factor Corrector Controller," the contents of which are incorporated herein by reference.

BACKGROUND OF THE INVENTION

1. Field of the Invention

The present invention relates to a power factor correction (PFC) controller and an operational method thereof, and particularly to a power factor correction controller and an operational method thereof that can be applied to different output voltages of a universal serial bus power delivery (USB-PD).

2. Description of the Prior Art

In the prior art, a power factor correction (PFC) controller applied to a flyback power converter utilizes a current generated from a current source in the power factor correction controller and a resistor outside the power factor correction controller to set a reference voltage corresponding to turning-on/turning-off of a power factor correction circuit coupled to the flyback power converter, wherein the power factor correction circuit is only suitable for the flyback power converter outputting a single output voltage. When a load coupled to the flyback power converter is heavy, because conduction loss of the flyback power converter is greater than switching loss of the flyback power converter, the power factor correction controller turns on the power factor correction circuit; and when the load is light, because the switching loss is greater than the conduction loss, the power factor correction controller turns off the power factor correction circuit.

However, when the flyback power converter is applied to a universal serial bus power delivery (USB-PD), the flyback power converter needs to output different output voltages to respond different output power of the flyback power converter. But, the power factor correction controller may not be able to respond the different output power to correctly turn on/turn off the power factor correction circuit, so efficiency of the flyback power converter in some specific load conditions (e.g. 50% of full load, 75% of full load) may be reduced. Therefore, when the flyback power converter is applied to the USB-PD, a user needs to manually adjust the resistor outside the power factor correction controller to change the reference voltage corresponding to turning-on/turning-off of the power factor correction circuit according to the different output voltages to make the power factor correction circuit be correctly turned on/turned off. Therefore, when the power factor correction controller operates, how to overcome the above-mentioned disadvantage of the power factor correction controller has become an important issue for the user.

SUMMARY OF THE INVENTION

An embodiment of the present invention provides a power factor correction controller applied to a primary side of a power converter. The power factor correction controller includes a feedback pin, a sensing pin, a current detecting circuit, an output voltage detecting circuit, and a determination circuit. The current detecting circuit is coupled to the feedback pin and the sensing pin, wherein the current detecting circuit is used for detecting an output current of a secondary side of the power converter according to a feedback voltage of the feedback pin and a sensing voltage of the sensing pin. The output voltage detecting circuit is coupled to the feedback pin, wherein the output voltage detecting circuit is used for detecting an output voltage of the secondary side of the power converter according to the feedback voltage. The determination circuit is coupled to the current detecting circuit and the output voltage detecting circuit, wherein the determination circuit is used for turning on or turning off a power factor correction circuit coupled to the power converter according to the output current and the output voltage.

Another embodiment of the present invention provides operational method of a power factor correction controller applied to a primary side of a power converter, wherein the power factor correction controller includes a feedback pin, a sensing pin, a current detecting circuit, an output voltage detecting circuit, and a determination circuit. The operational method includes the current detecting circuit detecting an output current of a secondary side of the power converter according to a feedback voltage of the feedback pin and a sensing voltage of the sensing pin; the output voltage detecting circuit detecting an output voltage of the secondary side of the power converter according to the feedback voltage; and the determination circuit turning on or turning off a power factor correction circuit coupled to the power converter according to the output current and the output voltage.

The present invention provides a power factor correction controller and an operational method thereof. The power factor correction controller and the operational method utilize a current detecting circuit to detect an output current of a secondary side of a power converter according to a feedback voltage of a feedback pin and a sensing voltage of a sensing pin, utilize an output voltage detecting circuit to detect an output voltage of the secondary side of the power converter according to the feedback voltage, utilize an input voltage detecting circuit to detect an input voltage inputted to a primary side of the power converter, and utilize a determination circuit to turn on/turn off a power factor correction circuit coupled to the power converter according to the output current, the output voltage, and the input voltage. Therefore, compared to the prior art, after the present invention detects output power (a product of the output current and the output voltage) and the input voltage, the present invention can automatically turn on/turn off the power factor correction circuit according to the output power and the input voltage to overcome a disadvantage of a power factor correction controller provided by the prior art when the power factor correction controller provided by the prior art operates.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
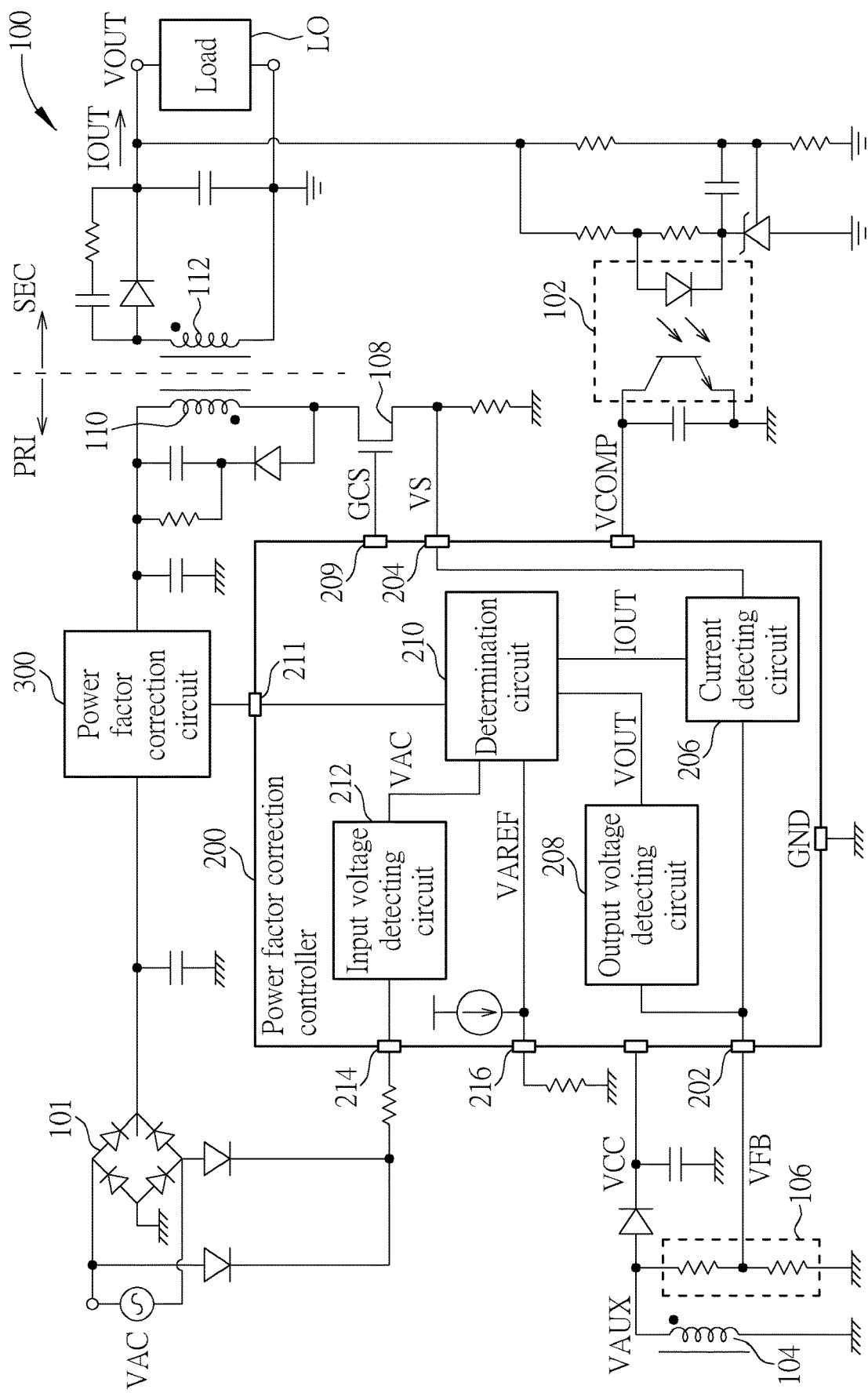
FIG. 1 is a diagram illustrating a power factor correction controller applied to a primary side of a power converter according to a first embodiment of the present invention.

Please refer to FIG. 1. FIG. 1 is a diagram illustrating a power factor correction controller 200 applied to a primary side PRI of a power converter 100 according to a first embodiment of the present invention, wherein as shown in FIG. 1, the power factor correction controller 200 includes a feedback pin 202, a sensing pin 204, a current detecting circuit 206, an output voltage detecting circuit 208, a determination circuit 210, and an input voltage detecting circuit 212, the power converter 100 is a flyback power converter, and a power factor correction circuit 300 is coupled between the power converter 100 and a bridge rectifier 101. In addition, as shown in FIG. 1, the output voltage detecting circuit 208 is coupled to the feedback pin 202, the current detecting circuit 206 is coupled to the feedback pin 202 and the sensing pin 204, the input voltage detecting circuit 212 is coupled to an input voltage pin 214 further included in the power factor correction controller 200, and the determination circuit 210 is coupled to the current detecting circuit 206, the output voltage detecting circuit 208, and the input voltage detecting circuit 212. In addition, as shown in FIG. 1, the primary side PRI of the power converter 100 is isolated from a secondary side SEC of the power converter 100 by a photo-coupler 102, wherein the photo-coupler 102 can generate a feedback compensation voltage VCOMP to the power factor correction controller 200, but the feedback compensation voltage VCOMP is unrelated to the main technical feature of the present invention, so further description thereof is omitted for simplicity. In addition, one of ordinary in the art should know that the power factor correction circuit 300 is used for improve a power factor of the power converter 100 to make the power factor of the power converter 100 approach 1 and simultaneously suppress harmonics of an output current IOUT of the power converter 100, and the power factor correction circuit 300 is also well-known to one of ordinary in the art, so a structure of the power factor correction circuit 300 is omitted for simplicity. In addition, FIG. 1 is a diagram only for describing the present invention, so some components unrelated to the main technical feature of the present invention are neglected. In addition, as shown in FIG. 1, the power factor correction controller 200 receives potential of ground through a ground pin 0, and the potential of ground applied to the primary side PRI of the power converter 100 is different from potential of ground applied to the secondary side SEC of the power converter 100.

As shown in FIG. 1, the output voltage detecting circuit 208 is used for receiving a feedback voltage VFB of the feedback pin 202, wherein because the feedback voltage VFB is generated by a voltage divider 106 dividing an auxiliary voltage VAUX of an auxiliary winding 104 further included in the power converter 100, and the auxiliary voltage VAUX corresponds to an output voltage VOUT of the secondary side SEC of the power converter 100, the feedback voltage VFB also corresponds to the output voltage VOUT. Therefore, the output voltage detecting circuit 208 can detect the output voltage VOUT according to the feedback voltage VFB. In addition, as shown in FIG. 1, the auxiliary voltage VAUX is also used for generating a supply voltage VCC applied to the power factor correction controller 200.

In addition, because the auxiliary voltage VAUX is generated after a power switch 108 of the primary side PRI of the power converter 100 is turned off, the current detecting circuit 206 coupled to the feedback pin 202 can obtain a discharge time TDIS of the secondary side SEC of the power converter 100 according to the feedback voltage VFB. In addition, as shown in FIG. 1, because the current detecting circuit 206 is also coupled to the sensing pin 204, the current detecting circuit 206 can utilize a sample-and-hold circuit (not shown in FIG. 1) to sample a sensing voltage VS of the sensing pin 204 and obtain a turning-on time of the power switch 108 (i.e. a turning-on time of the primary side PRI of the power converter 100) accordingly. Therefore, an integrator (not shown in FIG. 1) included in the current detecting circuit 206 can detect the output current IOUT according to the feedback voltage VFB (corresponding to the output voltage VOUT), the sensing voltage VS, the discharge time TDIS, the turning-on time of the power switch 108, and a turns ratio of a primary side winding 110 of the power converter 100 to a secondary winding 112 of the power converter 100. In addition, as shown in FIG. 1, the power factor correction controller 200 transmits a gate control signal GCS to the power switch 108 through a gate control pin 209 to turn on the power switch 108.

In addition, as shown in FIG. 1, because the input voltage detecting circuit 212 is coupled to the input voltage pin 214, the input voltage detecting circuit 212 can be used for detecting an input voltage VAC inputted to the primary side PRI of the power converter 100, wherein the input voltage VAC is an alternating voltage, and the input voltage VAC is between 90V and 264V. Therefore, in one embodiment of the present invention, the determination circuit 210 can be used for linearly or stepwise turning on/turning off the power factor correction circuit 300 through a driving pin 211 according to the output current IOUT, the output voltage VOUT, and the input voltage VAC, wherein the determination circuit 210 can utilize an inner multiplier (not shown in FIG. 1) to multiply the output current IOUT by the output voltage VOUT to determine output power POUT of the power converter 100, and linearly or stepwise turns on/turns off the power factor correction circuit 300 according to the output power POUT and the input voltage VAC. But, in another embodiment of the present invention, the determination circuit 210 linearly or stepwise turns on/turns off the power factor correction circuit 300 according to the output current IOUT and the output voltage VOUT, wherein the determination circuit 210 utilizes the inner multiplier to multiply the output current IOUT by the output voltage VOUT to determine the output power POUT, and linearly or stepwise turns on/turns off the power factor correction circuit 300 according to the output power POUT.

In addition, when a load LO coupled to the secondary side SEC of the power converter 100 is heavy, because conduction loss of the power converter 100 is greater than switching loss of the power converter 100, the power factor correction controller 200 intends to turn on the power factor correction circuit 300; and when the load LO is light, because the switching loss is greater than the conduction loss, the power factor correction controller 200 intends to turn off the power factor correction circuit 300. Therefore, TABLE I is obtained based on the above-mentioned operation of the power factor correction controller 200 and a regulation of European Union corresponding to the power factor correction circuit 300 needing to be turned on when the output power POUT is greater than 75 W, wherein TABLE I is an optimization table of the power converter 100 corresponding to turning-on and turning-off of the power factor correction circuit 300, and TABLE I takes the determination circuit 210 turning on/turning off the power factor correction circuit 300 according to the output current IOUT, the output voltage VOUT, the load LO, and the input voltage VAC as an example.

TABLE I

| VAC | POUT LO | 5 V/ 2 A | 10 V/ 5 A | 12 V/ 5 A | 15 V/ 5 A | 20 V/ 5 A |
|---|---|---|---|---|---|---|
| 115 V | 25% | OFF | OFF | OFF | OFF | OFF |
|  | 50% | OFF | OFF | OFF | OFF | ON |
|  | 75% | OFF | OFF | ON | ON | ON |
|  | 100% | OFF | ON | ON | ON | ON |
| 230 V | 25% | OFF | OFF | OFF | OFF | OFF |
|  | 50% | OFF | OFF | OFF | OFF | OFF |
|  | 75% | OFF | OFF | OFF | OFF | ON |
|  | 100% | OFF | OFF | OFF | ON | ON |

For example, as shown in TABLE I, when the input voltage VAC is 115V, the output voltage VOUT is 15V, the output current IOUT is 5 A, and the load LO is 75% of full load, the determination circuit 210 turns on the power factor correction circuit 300; and when the input voltage VAC is 230V, the output voltage VOUT is 15V, the output current IOUT is 5 A, and the load LO is 75% of full load, the determination circuit 210 turns off the power factor correction circuit 300.

In addition, as shown in TABLE I, when the input voltage VAC is 115V and the output voltage VOUT is not less than 10V, the determination circuit 210 may turn on the power factor correction circuit 300; and when the input voltage VAC is 230V and the output voltage VOUT is not less than 15V, the determination circuit 210 may turn on the power factor correction circuit 300. Therefore, in another embodiment of the present invention, after the output voltage VOUT is greater than a predetermined voltage (e.g. 10V), the determination circuit 210 starts to determine whether to turn on/turn off the power factor correction circuit 300 according to the output voltage VOUT, the output current IOUT, and the input voltage VAC. In addition, in another embodiment of the present invention, after the output voltage VOUT is greater than the predetermined voltage (e.g. 10V), the determination circuit 210 starts to determine whether to turn on/turn off the power factor correction circuit 300 according to the output voltage VOUT and the output current IOUT.

In addition, as shown in FIG. 1, an adjustable reference voltage VAREF inputted to the power factor correction controller 200 can be controlled by a resister 216 outside the power factor correction controller 200, wherein the determination circuit 210 utilizes the adjustable reference voltage VAREF to fine tune turning-on and turning-off of the power factor correction circuit 300 to optimize performance of the power converter 100. That is to say, the determination circuit 210 utilizes the adjustable reference voltage VAREF to fine tune turning-on and turning-off of the power factor correction circuit 300 linearly or stepwise to optimize performance of the power converter 100.

Figure 2:
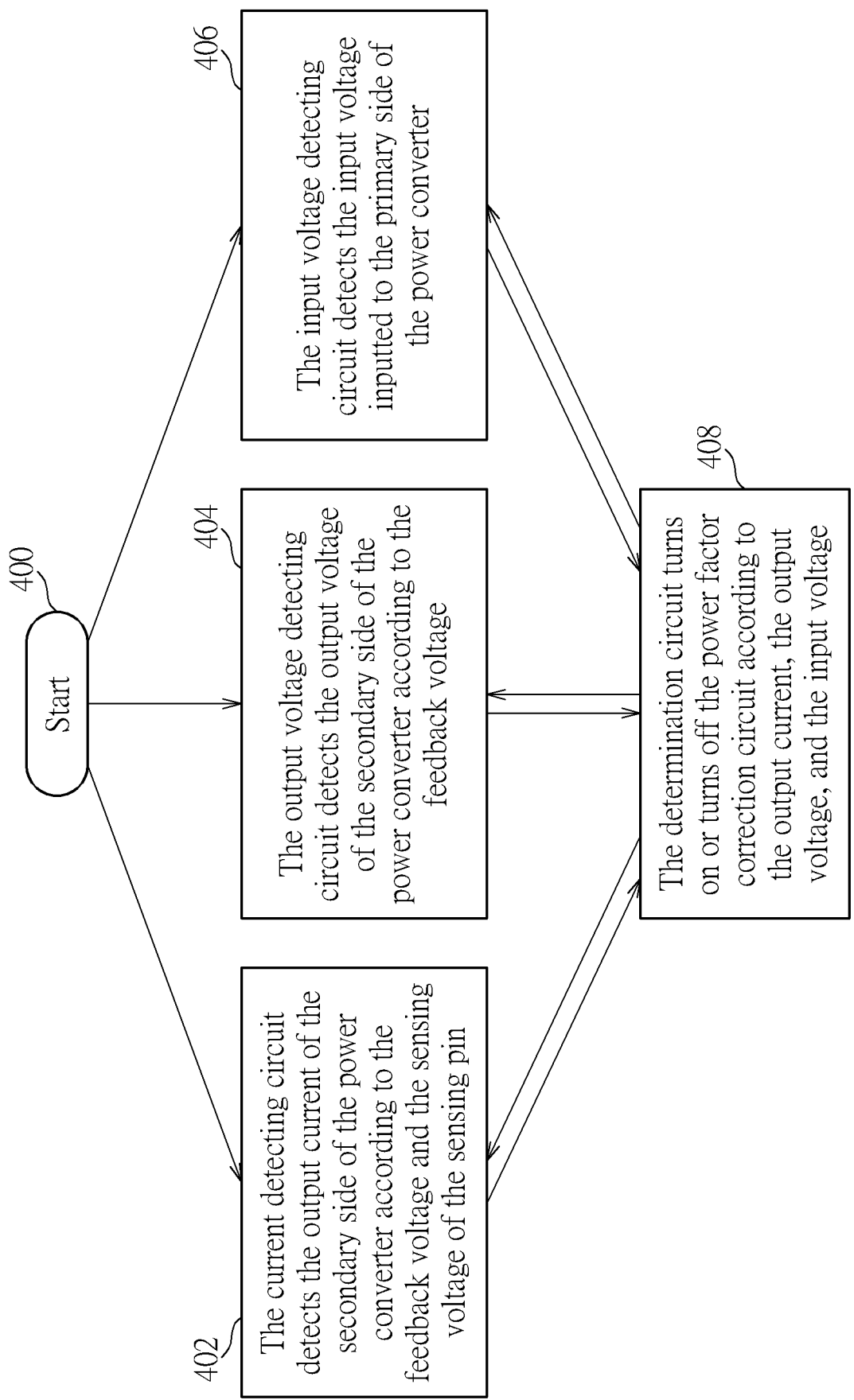
FIG. 2 is a flowchart illustrating an operational method of a power factor correction controller applied to a primary side of a power converter according to a second embodiment of the present invention.

In addition, please refer to FIGS. 1, 2. FIG. 2 is a flowchart illustrating an operational method of a power factor correction controller applied to a primary side of a power converter according to a second embodiment of the present invention. The operational method in FIG. 2 is illustrated using the power converter 100, the power factor correction controller 200, and the power factor correction circuit 300 in FIG. 1. Detailed steps are as follows:

Step 400: Start.
Step 402: The current detecting circuit 206 detects the output current IOUT of the secondary side SEC of the power converter 100 according to the feedback voltage VFB and the sensing voltage VS of the sensing pin 204, go to Step 408.
Step 404: The output voltage detecting circuit 208 detects the output voltage VOUT of the secondary side SEC of the power converter 100 according to the feedback voltage VFB, go to Step 408.
Step 406: The input voltage detecting circuit 212 detects the input voltage VAC inputted to the primary side PRI of the power converter 100, go to Step 408.
Step 408: The determination circuit 210 turns on/turns off the power factor correction circuit 300 according to the output current IOUT, the output voltage VOUT, and the input voltage VAC, go to Step 402, Step 404, and Step 406.

In Step 402, because the auxiliary voltage VAUX is generated after the power switch 108 of the primary side PRI of the power converter 100 is turned off, the current detecting circuit 206 can obtain the discharge time TDIS of the secondary side SEC of the power converter 100 according to the feedback voltage VFB. In addition, as shown in FIG. 1, the current detecting circuit 206 can utilize the sample-and-hold circuit (not shown in FIG. 1) to sample the sensing voltage VS of the sensing pin 204 and obtain the turning-on time of the power switch 108 (i.e. the turning-on time of the primary side PRI of the power converter 100). Therefore, the integrator (not shown in FIG. 1) included in the current detecting circuit 206 can detect the output current IOUT according to the feedback voltage VFB (corresponding to the output voltage VOUT), the sensing voltage VS, the discharge time TDIS, the turning-on time of the power switch 108, and the turns ratio of the primary side winding 110 of the power converter 100 to the secondary winding 112 of the power converter 100.

In Step 404, as shown in FIG. 1, the output voltage detecting circuit 208 can receive the feedback voltage VFB of the feedback pin 202, wherein because the feedback voltage VFB is generated by the voltage divider 106 dividing the auxiliary voltage VAUX of the auxiliary winding 104, and the auxiliary voltage VAUX corresponds to the output voltage VOUT of the secondary side SEC of the power converter 100, the feedback voltage VFB also corresponds to the output voltage VOUT. Therefore, the output voltage detecting circuit 208 can detect the output voltage VOUT according to the feedback voltage VFB.

In Step 406, in addition, as shown in FIG. 1, because the input voltage detecting circuit 212 is coupled to the input voltage pin 214, the input voltage detecting circuit 212 can be used for detecting the input voltage VAC inputted to the primary side PRI of the power converter 100, wherein the input voltage VAC is between 90V and 264V. Therefore, in Step 408, the determination circuit 210 can be used for linearly or stepwise turning on/turning off the power factor correction circuit 300 according to the output current IOUT, the output voltage VOUT, and the input voltage VAC, wherein the determination circuit 210 can utilize the inner multiplier (not shown in FIG. 1) to multiply the output current IOUT by the output voltage VOUT to determine the output power POUT of the power converter 100, and linearly or stepwise turns on/turns off the power factor correction circuit 300 according to the output power POUT and the input voltage VAC. In addition, in another embodiment of the present invention, the determination circuit 210 utilize the inner multiplier to multiply the output current IOUT by the output voltage VOUT to determine the output power POUT, and linearly or stepwise turns on/turns off the power factor correction circuit 300 according to the output power POUT.

In addition, as shown in TABLE I, when the input voltage VAC is 115V and the output voltage VOUT is not less than 10V, the determination circuit 210 may turn on the power factor correction circuit 300; and when the input voltage VAC is 230V and the output voltage VOUT is not less than 15V, the determination circuit 210 may turn on the power factor correction circuit 300. Therefore, in another embodiment of the present invention, after the output voltage VOUT is greater than the predetermined voltage (e.g. 10V), the determination circuit 210 starts to determine whether to turn on/turn off the power factor correction circuit 300 according to the output voltage VOUT, the output current IOUT, and the input voltage VAC. In addition, in another embodiment of the present invention, after the output voltage VOUT is greater than the predetermined voltage (e.g. 10V), the determination circuit 210 starts to determine whether to turn on/turn off the power factor correction circuit 300 according to the output voltage VOUT and the output current IOUT. In addition, as shown in FIG. 1, the determination circuit 210 utilizes the adjustable reference voltage VAREF to fine tune turning-on and turning-off of the power factor correction circuit 300 to optimize the performance of the power converter 100.

To sum up, the power factor correction controller and the operational method thereof utilize the current detecting circuit to detect the output current of the secondary side of the power converter according to the feedback voltage of the feedback pin and the sensing voltage of the sensing pin, utilize the output voltage detecting circuit to detect the output voltage of the secondary side of the power converter according to the feedback voltage, utilize the input voltage detecting circuit to detect the input voltage inputted to the primary side of the power converter, and utilize the determination circuit to turn on/turn off the power factor correction circuit according to the output current, the output voltage, and the input voltage. Therefore, compared to the prior art, after the present invention detects the output power (a product of the output current and the output voltage) and the input voltage, the present invention can automatically turn on/turn off the power factor correction circuit according to the output power and the input voltage to overcome a disadvantage of a power factor correction controller provided by the prior art when the power factor correction controller provided by the prior art operates.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power factor correction controller applied to a primary side of a power converter, comprising:
   a feedback pin;
   a sensing pin;
   a current detecting circuit coupled to the feedback pin and the sensing pin for detecting an output current of a secondary side of the power converter according to a feedback voltage of the feedback pin and a sensing voltage of the sensing pin;
   an output voltage detecting circuit coupled to the feedback pin for detecting an output voltage of the secondary side of the power converter according to the feedback voltage;
   a determination circuit coupled to the current detecting circuit and the output voltage detecting circuit for turning on or turning off a power factor correction circuit coupled to the power converter according to the output current and the output voltage; and
   an input voltage detecting circuit coupled to an input voltage pin further comprised in the power factor correction controller, wherein the input voltage detecting circuit is used for detecting an input voltage inputted to the primary side of the power converter, and the input voltage is an alternating voltage.

2. The power factor correction controller of claim 1, wherein the power converter is a flyback power converter.

3. The power factor correction controller of claim 1, wherein the determination circuit linearly or stepwise turns on or turns off the power factor correction circuit according to the output current and the output voltage.

4. The power factor correction controller of claim 1, wherein after the output voltage is greater than a predetermined voltage, the determination circuit starts to turn on or turn off the power factor correction circuit according to the output voltage and the output current.

5. The power factor correction controller of claim 1, wherein the determination circuit turns on or turns off the power factor correction circuit further according to the output current, the output voltage, and the input voltage.

6. The power factor correction controller of claim 1, wherein the determination circuit utilizes an inner multiplier to multiply the output current by the output voltage to determine output power of the power converter, and turns on or turns off the power factor correction circuit according to the output power and the input voltage.

7. The power factor correction controller of claim 1, wherein after the output voltage is greater than a predetermined voltage, the determination circuit starts to turn on or turn off the power factor correction circuit according to the output voltage, the output current, and the input voltage.

8. A power factor correction controller applied to a primary side of a power converter, comprising:
   a feedback pin;
   a sensing pin;
   a current detecting circuit coupled to the feedback pin and the sensing pin for detecting an output current of a secondary side of the power converter according to a feedback voltage of the feedback pin and a sensing voltage of the sensing pin;
   an output voltage detecting circuit coupled to the feedback pin for detecting an output voltage of the secondary side of the power converter according to the feedback voltage; and
   a determination circuit coupled to the current detecting circuit and the output voltage detecting circuit for turning on or turning off a power factor correction circuit coupled to the power converter according to the output current and the output voltage, wherein the determination circuit utilizes an inner multiplier to multiply the output current by the output voltage to determine output power of the power converter, and turns on or turns off the power factor correction circuit according to the output power.

9. An operational method of a power factor correction controller applied to a primary side of a power converter, wherein the power factor correction controller comprises a feedback pin, a sensing pin, a current detecting circuit, an output voltage detecting circuit, and a determination circuit, the operational method comprising:

the current detecting circuit detecting an output current of a secondary side of the power converter according to a feedback voltage of the feedback pin and a sensing voltage of the sensing pin;

the output voltage detecting circuit detecting an output voltage of the secondary side of the power converter according to the feedback voltage;

an input voltage detecting circuit detecting an input voltage inputted to the primary side of the power converter, wherein the input voltage is an alternating voltage; and the determination circuit turning on or turning off a power factor correction circuit coupled to the power converter according to the output current, the output voltage, and the input voltage.

10. The operational method of claim 9, wherein the determination circuit turns on or turns off the power factor correction circuit linearly or stepwise according to the output current and the output voltage.

11. The operational method of claim 9, wherein after the output voltage is greater than a predetermined voltage, the determination circuit starts to turn on or turn off the power factor correction circuit according to the output voltage and the output current.

12. The operational method of claim 9, wherein the determination circuit utilizes an inner multiplier to multiply the output current by the output voltage to determine output power of the power converter, and turns on or turns off the power factor correction circuit according to the output power and the input voltage.

13. The operational method of claim 9, wherein after the output voltage is greater than a predetermined voltage, the determination circuit starts to turn on or turn off the power factor correction circuit according to the output voltage, the output current, and the input voltage.

14. An operational method of a power factor correction controller applied to a primary side of a power converter, wherein the power factor correction controller comprises a feedback pin, a sensing pin, a current detecting circuit, an output voltage detecting circuit, and a determination circuit, the operational method comprising:

the current detecting circuit detecting an output current of a secondary side of the power converter according to a feedback voltage of the feedback pin and a sensing voltage of the sensing pin;

the output voltage detecting circuit detecting an output voltage of the secondary side of the power converter according to the feedback voltage; and the determination circuit turning on or turning off a power factor correction circuit coupled to the power converter according to the output current and the output voltage, wherein the determination circuit utilizes an inner multiplier to multiply the output current by the output voltage to determine output power of the power converter, and turns on or turns off the power factor correction circuit according to the output power.

* * * * *